(12) United States Patent
Hong et al.

(10) Patent No.: US 9,125,219 B2
(45) Date of Patent: Sep. 1, 2015

(54) METHOD FOR SELECTING COMMUNICATION CHANNEL IN COMMUNICATION DEVICE OF WIDEBAND WIRELESS COMMUNICATION SYSTEM AND APPARATUS THEREOF

(75) Inventors: Seung Eun Hong, Daejeon (KR); Yong Sun Kim, Gyeryong-si (KR); Woo Yong Lee, Daejeon (KR); Hyun Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 142 days.

(21) Appl. No.: 13/225,327

(22) Filed: Sep. 2, 2011

(65) Prior Publication Data

US 2012/0063410 A1 Mar. 15, 2012

(30) Foreign Application Priority Data

Sep. 3, 2010 (KR) .................. 10-2010-0086661
Aug. 11, 2011 (KR) .................. 10-2011-0080140

(51) Int. Cl.
*H04W 72/08* (2009.01)
*H04W 72/04* (2009.01)
*H04B 7/26* (2006.01)
*H04W 72/12* (2009.01)

(52) U.S. Cl.
CPC ........... *H04W 72/085* (2013.01); *H04B 7/2656* (2013.01); *H04W 72/0406* (2013.01); *H04W 72/1231* (2013.01)

(58) Field of Classification Search
None
See application file for complete search history.

(56) References Cited

U.S. PATENT DOCUMENTS

| 2007/0060160 | A1* | 3/2007 | Hur et al. ...................... 455/450 |
| 2009/0232105 | A1* | 9/2009 | Kesselman et al. ........... 370/336 |
| 2010/0020732 | A1* | 1/2010 | Gaddam et al. .............. 370/310 |
| 2010/0177718 | A1* | 7/2010 | Harle et al. ................... 370/329 |
| 2011/0069688 | A1* | 3/2011 | Zhang et al. ................. 370/338 |
| 2011/0116393 | A1* | 5/2011 | Hong et al. ................... 370/252 |
| 2011/0151794 | A1* | 6/2011 | Mashimo ..................... 455/63.1 |
| 2012/0087276 | A1* | 4/2012 | Huang et al. ................. 370/253 |

FOREIGN PATENT DOCUMENTS

WO WO 2010035157 A1 * 4/2010 ............ H04W 72/04

OTHER PUBLICATIONS

KR 10-2011-0080140 (English Machine Translation), Hong et al., Filing Date Aug. 11, 2011, pp. 17-18.*

* cited by examiner

*Primary Examiner* — Andrew Chriss
*Assistant Examiner* — Joshua A Kading
(74) *Attorney, Agent, or Firm* — Rabin & Berdo, P.C.

(57) ABSTRACT

Provided is a method and apparatus for setting up a channel for communication between distributed devices in a wireless communication system. A method of selecting a communication channel in a communication device of a wireless communication system may include requesting scanning of channels between the communication device and a discovery device, receiving a channel scanning response message including a Distributed Reservation Protocol (DRP) Availability Information Element (IE) assigned for each scanned channel, and selecting a channel based on the DRP Availability IE.

25 Claims, 10 Drawing Sheets

700

| Octets: 1 | 1 | N(0 to 32) |
|---|---|---|
| Element ID | Length(=N) | DRP Availability Bitmap |
| 710 | 720 | 730 |

METHOD FOR SELECTING COMMUNICATION CHANNEL IN COMMUNICATION DEVICE OF WIDEBAND WIRELESS COMMUNICATION SYSTEM AND APPARATUS THEREOF

TECHNICAL FIELD

The present invention relates to a method and apparatus for setting up a channel for communication between distributed devices in a wireless communication system, and more particularly, to a configuration of a message used for the channel setting.

BACKGROUND ART

A millimeter wave band corresponding to 57 GHz to 66 GHz has been proposed as a scheme to ease a worldwide shortage of frequency resources. Also, since a wireless frequency signal of a millimeter wave band can be configured, a wireless communication system supporting a transmission rate of several gigabytes is recently gaining an attention.

A millimeter wave has unique characteristics, for example, a short wavelength, a high frequency, a wideband, a large amount of exchange with atmospheric components, and the like. The millimeter wave may have advantages in that a high data transmission rate can be obtained using an ultra wideband, that the millimeter wave is robust against peripheral interference due to a strong straightness, that the millimeter wave has an excellent security, that a frequency reuse is easy, and the like. A short wavelength of the millimeter wave may enable various devices to be miniaturized and be lightened.

In contrast, the millimeter wave may have disadvantages in that a propagation distance is short due to an absorption by oxygen molecules and due to a rainfall attenuation phenomenon that a line of sight needs to be secured due to a characteristic of straightness, and the like.

To complement the disadvantages of the millimeter wave, a directional antenna may be used. The directional antenna may concentrate power in a predetermined direction to enhance the antenna gain efficiency, thereby expanding a communication range.

Also, due to characteristics of the millimeter wave, the above wireless communication system may configure a network using distributed nodes that are positioned in a near distance.

A device to initiate a communication may verify neighbor devices in a current network, and may perform a discovery procedure of discovering a device to be communicated with.

When a communication device that is desired to be communicated with through the discovery procedure is determined, a process of selecting a channel suitable for communication from among channels allowed for the communication may be performed.

DISCLOSURE OF INVENTION

Technical Goals

An aspect of the present invention provides a configuration method of a message that is used to exchange information obtained by scanning a plurality of channels in order to select a channel suitable for a communication between distributed devices in a wireless communication system.

Another aspect of the present invention also provides a configuration method of a message indicating whether each of a plurality of channels corresponds to a channel supporting a superframe structure.

Another aspect of the present invention also provides a method of selecting an optimal communication channel using information obtained by scanning a plurality of channels.

Technical Solutions

According to an aspect of the present invention, there is provided a method of selecting a communication channel in a communication device of a wireless communication system, the method including: requesting scanning of channels between the communication device and a discovery device; receiving a channel scanning response message including a Distributed Reservation Protocol (DRP) Availability Information Element (IE) assigned for each scanned channel; and selecting a channel based on the DRP Availability IE.

The channel scanning response message may include a Channel Measurement IE.

The requesting may include transmitting information about a channel to be scanned using a channel bitmap field.

The Channel Measurement IE may include information about whether a superframe structure exists in the scanned channel and information about a noise plus interference level corresponding to resources of the scanned channel.

The DRP Availability IE may include a time interval, a frequency, a code, or a combination thereof.

The DRP Availability IE may include an availability of a Medium Access Slot (MAS) constituting the scanned channel.

The channel selection method may further include requesting the discovery device for a resource based on the DRP Availability IE and the Channel Measurement IE of the selected channel to be assigned with the resource from the discovery device.

The requesting may include requesting scanning of the channels using a channel selection command frame. The channel selection command frame may include a channel selection control field. The channel selection control field may include a command identification (ID) field indicating that a use of the channel selection command frame is a channel scanning request, a reason code field, and a channel bitmap field indicating a channel to be scanned.

The receiving may include receiving the channel scanning response message using a channel selection command frame. The channel selection command frame may include a channel section control field and IE fields. The channel selection control field may include a channel bitmap field indicating a channel scanned by the discovery device, and the IE fields include a Channel Measurement IE field and a DRP Availability IE field corresponding to the scanned channel.

The DRP Availability IE field may include DRP Availability indicating whether MASs constituting the scanned channel are available, and length information indicating a length of the DRP Availability.

The Channel Measurement IE field may include ID information indicating a Channel Measurement IE, length information indicating a length of the Channel Measurement IE, a beam identifier for identifying a directional beam used for the scanning, a measurement report including measurement results of resources of the scanned channel, and information about a number of measurement reports.

The measurement report may include a zone bitmap for identifying zones including a predetermined number of MASs and a MAS bitmap for identifying MASs included in each zone.

The measurement reports may include a noise plus interference level indicator (NILI) measured for each MAS included in the each zone.

The NILI may be determined as a value coded to a measured noise plus interference level based on a predetermined coding table.

When a superframe structure does not exist in the scanned channel, '0' may be set to length information indicating the length of the DRP Availability.

When a superframe structure does not exist in the scanned channel, '1' may be set to information about the number of measurement reports, '0' may be set to the zone bitmap and the MAS bitmap, and an NILI coded to the average noise plus interference level of the scanned channel may be set in the measurement results.

The selecting may include obtaining information about an available resource based on the DRP Availability IE, and selecting a communication channel having the largest amount of resources in which interference is less than or equal to a predetermined level, from among available communication channels based on the Channel Measurement IE.

According to another aspect of the present invention, there is provided a method of selecting a communication channel in a discovery device of a wireless communication system, the method including: obtaining a DRP Availability IE assigned to a scanned channel through a beacon message that is received by the scanned channel from neighbor devices; measuring a noise plus interference level corresponding to resources of the scanned channel; and transmitting a channel scanning response message including a Channel Measurement IE and the DRP Availability IE, the Channel Measurement IE including information about whether a superframe structure exists for each scanned channel and information about the measured noise plus interference level.

The channel selection method may further include determining whether the superframe structure exists in the scanned channel based on whether the beacon message is received by the scanned channel from the neighbor devices.

The channel selection method may further include receiving, from a communication device, a channel scanning request message requesting scanning of channels allowed for communication between the communication device and a discovery device.

The channel selection method may further include receiving, from a communication device, a request for a resource with respect to a selected channel, and assigning the resource to the communication device.

The transmitting may include transmitting the channel scanning response message using a channel selection command frame. The channel selection command frame may include a channel selection control field and IE fields. The channel selection control field may include a channel bitmap field indicating a scanned channel, and the IE fields include a Channel Measurement IE field and a DRP Availability IE field assigned for each scanned channel.

The DRP Availability IE field may include DRP Availability indicating whether MASs constituting the scanned channel are available, and length information indicating a length of the DRP Availability.

The Channel Measurement IE field may include ID information indicating the Channel Measurement IE, length information indicating a length of the Channel Measurement IE, a beam identifier for identifying a directional beam used for the scanning, a measurement report including measurement results of resources of the scanned channel, and information about a number of measurement reports.

When the superframe structure does not exist in the scanned channel, '0' may be set to length information indicating the length of the DRP Availability.

When the superframe structure does not exist in the scanned channel, '1' is set to information about the number of measurement reports, '0' may be set to a zone bitmap for identifying zones including a predetermined number of MASs and a MAS bitmap for identifying MASs included in each zone, and a NILI coded to the average noise plus interference level of the scanned channel may be set in the measurement results.

According to still another aspect of the present invention, there is provided an apparatus for selecting a communication channel in a communication device of a wireless communication system, the apparatus including: a scanning request unit to request scanning of channels between the communication device and a discovery device; a message receiver to receive a channel scanning response message including a DRP Availability IE assigned for each scanned communication channel and a Channel Measurement IE; a channel selector to select a channel based on the Channel Measurement IE and the DRP Availability IE; and a channel change request unit to request a channel change to the selected channel by transmitting information about the selected channel to the discovery device.

According to yet another aspect of the present invention, there is provided an apparatus for selecting a communication channel in a discovery device of a wireless communication system, the apparatus including: a determining unit to determine whether a superframe structure exists in a scanned channel; a resource information obtaining unit to obtain a DRP Availability IE assigned to the scanned channel through a beacon message that is received by the scanned channel from neighbor devices; a resource information measuring unit to measure a noise plus interference level corresponding to resources of the scanned channel; a message transmitter to transmit a channel scanning response message including the DRP Availability IE and a Channel Measurement IE including information about whether the superframe structure exists for each scanned communication channel and information about the measured noise plus interference level; and a channel change determining unit to determine whether to change a channel in response to a channel change request for changing a channel to a channel that is determined based on the channel scanning response message.

Effect of the Invention

According to embodiments of the present invention, in a wireless communication system, distributed terminals may perform an antenna alignment with a discovery device to communicate with prior to requesting a communication resource, may request a signal measurement with respect to time resources of a channel via an aligned antenna, and may receive a signal measurement result from the discovery device. Through this, it is possible to maximize a space reuse according to the antenna alignment during a subsequent resource request and assignment process, and to assign optimal communication resources.

BEST MODE FOR CARRYING OUT THE INVENTION

Figure 1:
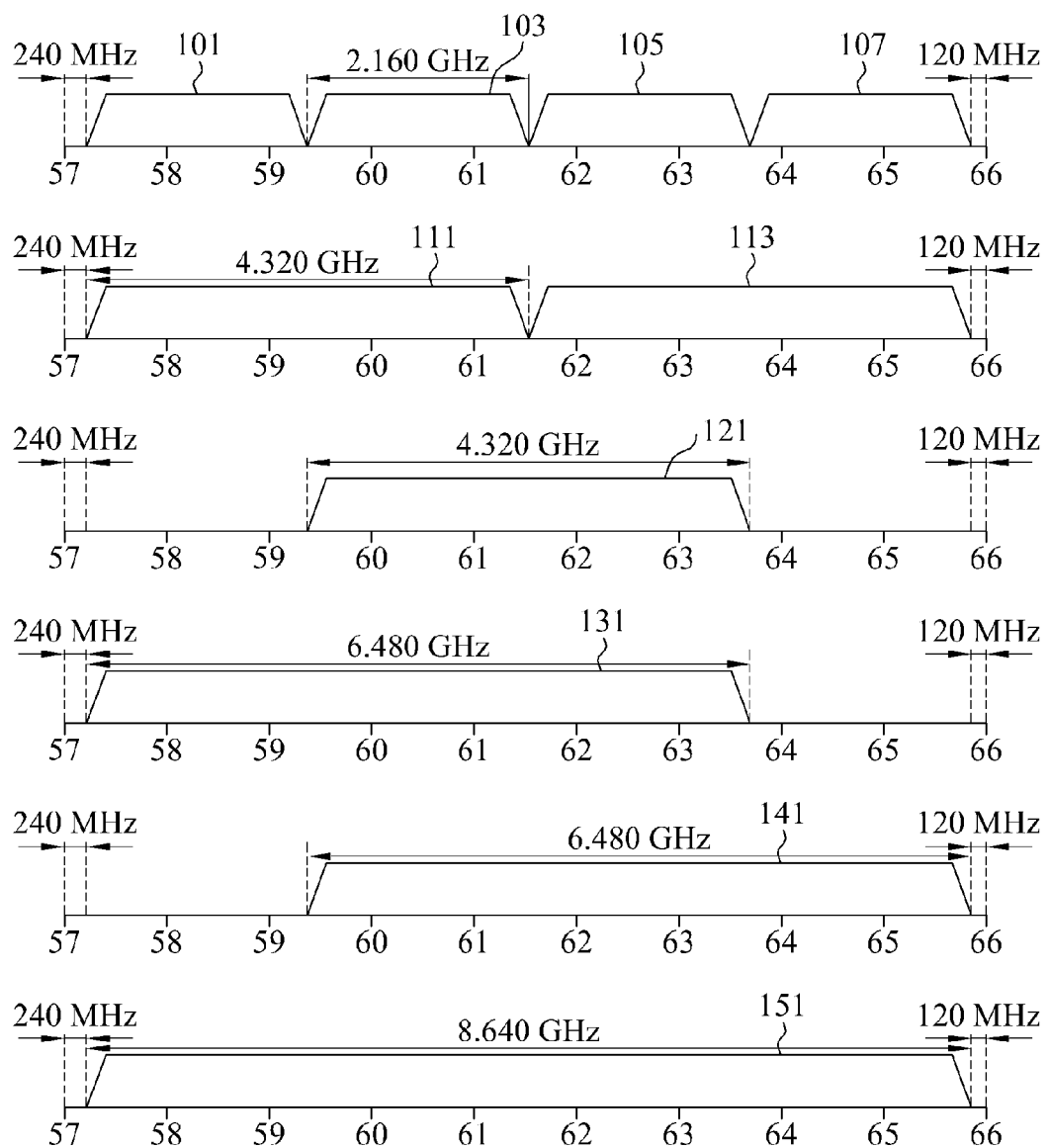
FIG. 1 illustrates a channel structure allowed in a wireless system using a frequency band of 60 GHz.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a channel structure allowed in a wireless system using a frequency band of 60 GHz.

Systems using the frequency band of 60 GHz may use channels assigned as shown in FIG. 1. Referring to FIG. 1, in the frequency band of 60 GHz, four channels 101, 103, 105, and 107 having a bandwidth of 2.160 GHz may be assigned. Also, three channels 111, 113, and 121 having a bandwidth of 4.320 GHz may be assigned. Also, two channels 131 and 141 having a bandwidth of 6.480 GHz may be assigned. Also, a channel 151 having a bandwidth of 8.640 GHz may be assigned. That is, ten channels may be assigned in the frequency band of 60 GHz.

Figure 2:
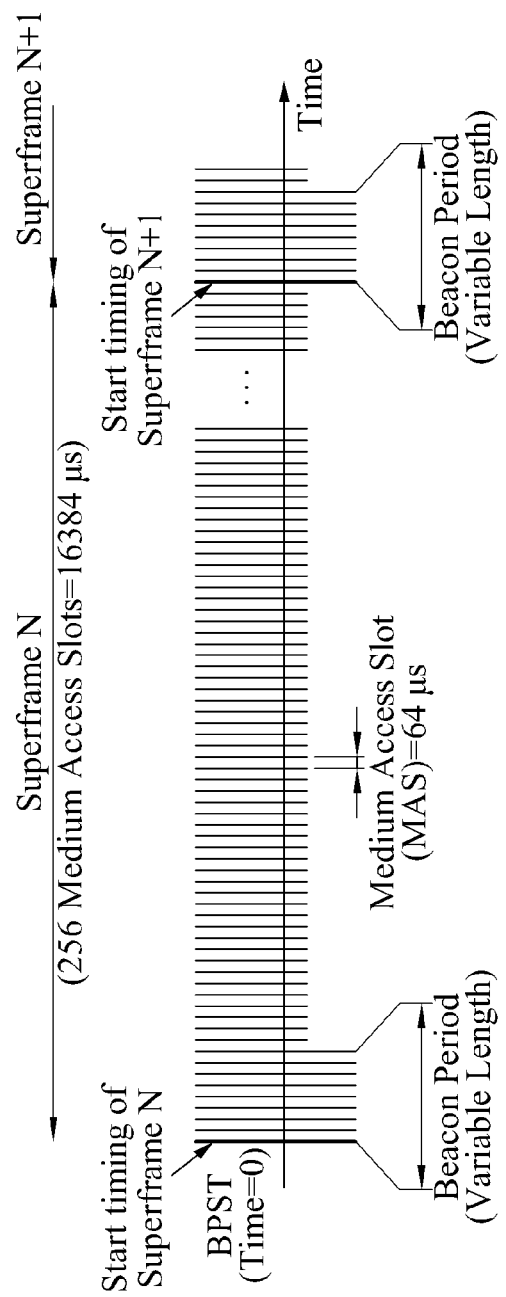
FIG. 2 illustrates a superframe structure for a time division multiple access (TDMA) scheme in a distributed ad hoc network.

FIG. 2 illustrates a superframe structure for a time division multiple access (TDMA) scheme in a distributed ad hoc network.

Referring to FIG. 2, a superframe includes Medium Access Slots (MASs) having a fixed length, and the superframe is divided into 256 MASs. MASs constituting the superframe may be largely divided into a beacon period and a data exchange period. The beacon period may include initial MASs of the superframe, and each of devices constituting respective nodes may transmit a beacon message including its Media Access Control (MAC) information. Remaining MASs may be used for data exchange. A length of the beacon period may vary based on a description of the beacon message. A distributed MAC protocol enables each device to reserve predetermined MASs using the beacon message and may specify the reserved MASs to be used only by a device having made a reservation. Each device may verify whether scanned channels support the superframe structure. When the superframe structure is supported, information about available MASs may also be obtained using the beacon message.

Figure 3:
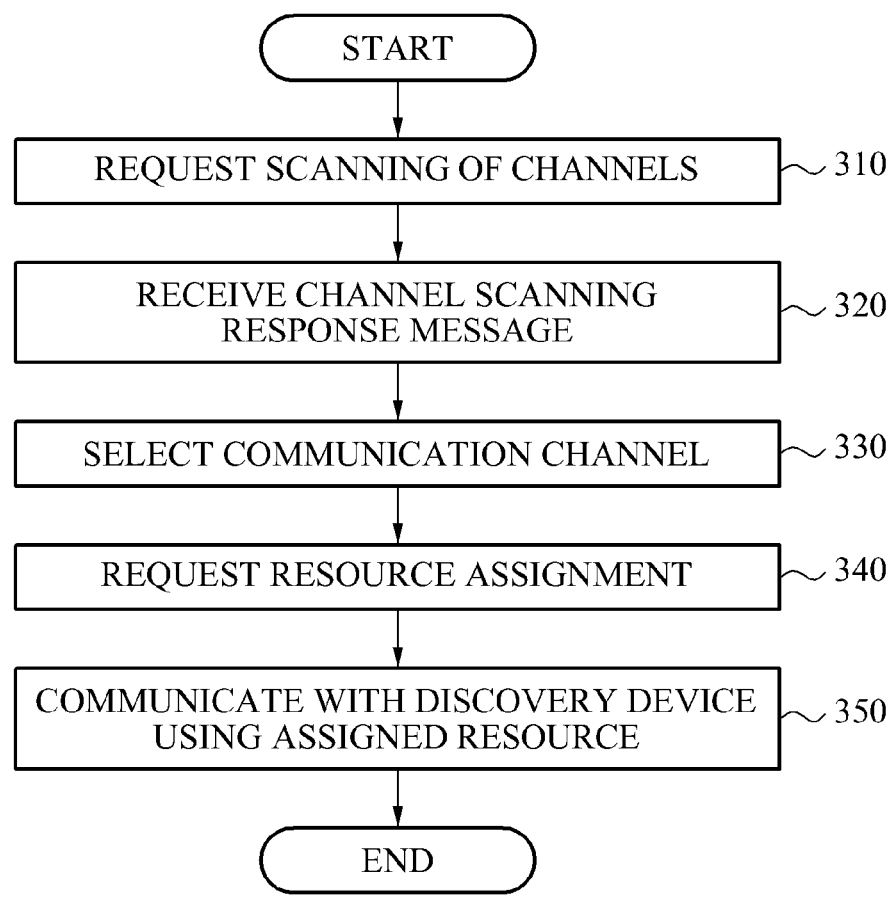
FIG. 3 is a flowchart illustrating a process of selecting a communication channel in a communication device according to an embodiment of the present invention.

FIG. 3 is a flowchart illustrating a process of selecting a communication channel in a communication device according to an embodiment of the present invention.

In operation 310, the communication device may request scanning of channels allowed for a communication between the communication device and a discovery device. In the description below, the device that discovered from the discovery procedure may be referred to as a discovery device. The channels allowed for communication may indicate channels communicable in a frequency band of a millimeter wave. The communication device may transmit a channel scanning request command frame to the discovery device so that the discovery device may search for channels suitable for the communication. The discovery device may receive the channel scanning request command frame and scan the communicable channels.

The communication device may request scanning of the channels allowed for the communication, using a channel selection command frame. The channel selection command frame may include a channel selection control field. The channel selection control field may include a command identification (ID) field indicating that a use of the channel selection command frame is a channel scanning request, a reason code field, and a channel bitmap field indicating a channel to be scanned. The channel selection control field will be further described with reference to FIG. 5.

The communication device may transmit information about a channel to be scanned among the channels allowed for the communication, using the channel bitmap field.

In operation 320, the communication device may receive a channel scanning response message. The channel scanning response message may include a Channel Measurement Information Element (IE) measured for each scanned channel and a Distributed Reservation Protocol (DRP) Availability LE assigned for each scanned channel. The discovery device may measure the Channel Measurement IE for each channel by scanned channels. A channel to be scanned may also be referred to as a scanning channel. The Channel Measurement IE may include information about whether a superframe structure exists in a scanning channel and information about a noise plus interference level corresponding to resources of the scanning channel. For example, a MAS may be included in the resources of the scanning channel.

Also, the discovery device may obtain a DRP Availability IE assigned for a corresponding channel by receiving a beacon frame from a neighbor device positioned in the channel. The beacon frame may include resource information used by the neighbor device. Here, the DRP Availability IE may include a time interval, a frequency, a code, or a combination thereof. For example, the DRP Availability LE may include information about an availability of a MAC constituting the scanning channel.

The communication device may receive the channel scanning response message using the channel selection command frame. Here, a "channel scanning response" command may be assigned to the channel selection control field constituting the channel selection command frame. Also, the channel selection command frame may include IE fields. The IE fields may include a DRP Availability IE field and a Channel Measurement IE field corresponding to the scanning channel. The DRP Availability IE field may indicate a DRP Availability IE assigned for each scanning channel. The Channel Measurement IE field may indicate a Channel Measurement IE measured for each scanning channel.

In operation 330, the communication device may select a communication channel from among the channels allowed for the communication based on the Channel Measurement IE and the DRP Availability IE. More specifically, the communication device may obtain information about available resources based on the DRP Availability IE, and may select a communication channel having the largest amount of resources in which interference is less than or equal to a predetermined level, from among available communication channels based on the Channel Measurement IE. For example, the communication device may obtain information about an available MAC for each channel based on the DRP Availability IE. Also, the communication device may consider the affect of noise and interference against the available MAC based on the Channel Measurement IE. Accordingly, the communication device may select, from among channels as the communication channel, a channel having the largest number of MASs in which the affect of noise and interference is less than or equal to a predetermined reference.

In operation 340, the communication device may request the discovery device for a resource based on the Channel Measurement IE and the DRP Availability IE of the selected communication channel. The communication device may transmit, to the discovery device, a channel change request command including information about the selected channel. When a channel change response message accepting a channel change is received from the discovery device, the communication device may request the discovery device for assigning a resource of the selected channel.

In operation 350, the communication device may be assigned with the resource from the discovery device and may communicate with the discovery device through the assigned resource. In this example, the discovery device may reject a change to the channel selected by the communication device, on the ground of that a resource to perform the communication is insufficient in the selected channel. Also, the discovery device may reject the channel change on the ground of a decision that does not match description included in the channel scanning response message. Also, the discovery device may reject the channel change on the ground of that the selected channel is a change unsupported by the discovery device. When a response message indicating a channel change rejection is received from the discovery device, the communication device may perform again operation 330 of selecting the communication channel.

Figure 4:
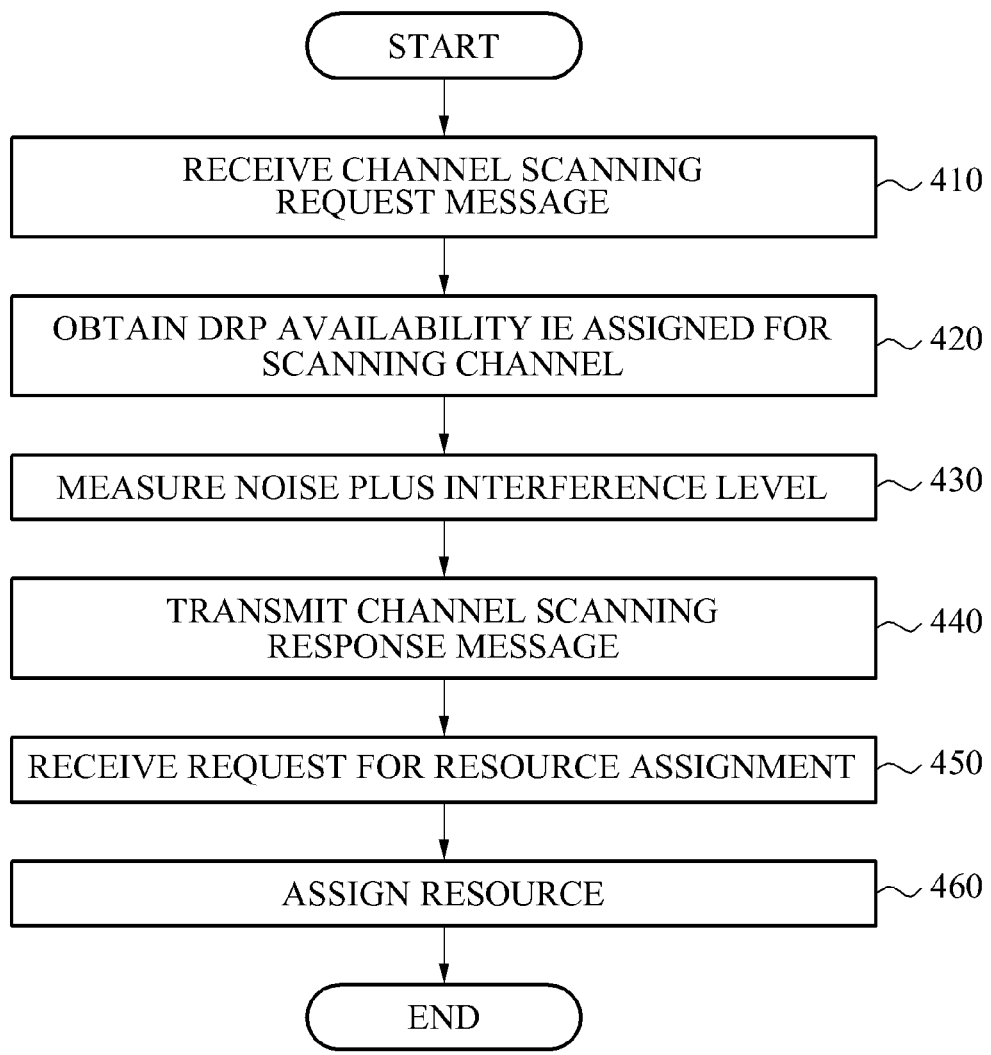
FIG. 4 is a flowchart illustrating a process of selecting a communication channel in a discovery device according to an embodiment of the present invention.

FIG. 4 is a flowchart illustrating a process of selecting a communication channel in a discovery device according to an embodiment of the present invention.

In operation 410, the discovery device may receive, from a communication device, a channel scanning request message requesting scanning of channels allowed for a communication between the communication device and the discovery device.

In operation 420, the discovery device may obtain a DRP Availability IE assigned for a scanning channel through a beacon message that is received by a scanning channel from neighbor devices. The scanning channel may indicate a channel to be scanned in response to a request of the communication device. The beacon message may include resource information used by a neighbor device. The DRP Availability IE may include information about an availability of an MAC constituting the scanning channel.

Also, the discovery device may determine whether a superframe structure exists in the scanning channel, based on whether a beacon message is received by the scanning channel from the neighbor devices. Whether the superframe structure exists may indicate whether the scanning channel is configured as the superframe structure. The beacon message may be transmitted using some MASs of the superframe structure. Therefore, that the beacon message is received from the neighbor devices may indicate that the superframe structure exists in the scanning channel.

In operation 430, the discovery device may measure a noise plus interference level corresponding to resources of the scanning channel. For example, a MAS may be included in resources of the scanning channel. The discovery device may measure the noise plus interference level from the neighbor devices for each MAS. That is, the discovery device may measure the noise plus interference level in a given MAS of the scanning channel.

In operation 440, the discovery device may transmit a channel scanning response message. The channel scanning response message may include a Channel Measurement IE and a DRP Availability IE. Here, the Channel Measurement IE may include information about whether the superframe structure exists and information about the measured noise plus interference level, for each scanned communication channel.

The discovery device may transmit the channel scanning response message using the channel selection command frame. The channel selection command frame may include a channel selection control field and IE fields. The channel selection control field may include a channel bitmap field indicating a channel scanned by the discovery device. The IE fields may include a DRP Availability IE field and a Channel Measurement IE field for each scanned channel.

The DRP Availability IE field may include DRP Availability indicating whether MASs constituting the scanned channel are available, and length information indicating a length of the DRP Availability.

When the superframe structure does not exist in the scanning channel, the discovery device may set '0' to length information indicating the length of the DRP Availability. That '0' is set to the length information may indicate that information about an obtainable resource is absent in the scanning channel. Also, that '0' is set to the length information may indicate that all of MASs assigned to the scanning channel are unavailable.

The Channel Measurement IE field may include ID information indicating the Channel Measurement IE, length information indicating a length of the Channel Measurement IE, a beam identifier for identifying a directional beam used for the scanning, a measurement report including measurement results of resources of the scanned channel, and information about a number of measurement reports. The noise plus interference level measured in a given MAS of the scanning channel may be included in the measurement result. The measurement report may include a zone bitmap for identifying zones including a predetermined number of MASs, a MAS bitmap for identifying MASs included in the zone, and a noise plus interference level indicator (NILI) measured for each MAS.

When the superframe structure does not exist in the scanning channel, the discovery device may set '1' to information about the number of measurement reports. That is, the discovery device may indicate that the superframe structure does not exist in the scanning channel through a single measurement report. Also, the discovery device may set '0' to the zone bitmap and the MAS bitmap. When the superframe structure does not exist in the scanning channel, no resource may be assigned to a channel. Also, the discovery device may set a NILI coded to the average noise plus interference level of the scanned channel in the measurement results. The NILI may be coded as a value mapping the measured noise plus interference level, based on a coding table.

In operation 450, the discovery device may receive information about the selected communication channel from the communication device. The discovery device may receive, from the communication device, a channel change request message requesting a channel change to the selected communication channel. In this instance, the discovery device may reject the channel change on the ground of that a resource to perform a communication is insufficient in the communication channel selected by the communication device. Also, the discovery device may reject the channel change on the ground of a decision that does not match description included in the channel scanning response message. Also, the discovery device may reject the channel change on the ground of that the selected channel is a channel unsupported by the discovery device. When the discovery device accepts a channel change request for a channel change to an optimal communication channel, the discovery device may transmit an accepted channel change response message to the communication device. The discovery device may receive a request for assigning a resource with respect to the optimal communication channel from the communication device.

In operation 460, the discovery device may assign the resource required for the communication in the communication channel to the communication device.

Figure 5:
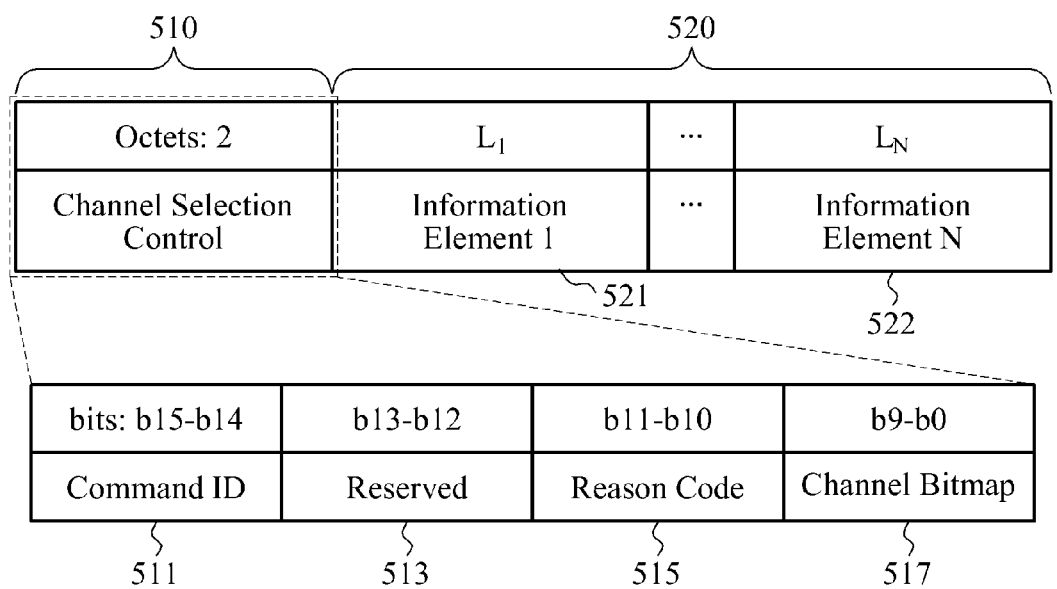
FIG. 5 illustrates a structure of a channel selection command frame in a distributed Media Access Control (MAC) protocol wireless system according to an embodiment of the present invention.

FIG. 5 illustrates a structure of a channel selection command frame 500 in a distributed MAC protocol wireless system according to an embodiment of the present invention.

Referring to FIG. 5, the channel selection command frame 500 may include a channel selection control field 510 and a plurality of Information Element (IE) fields 520. Here, two bytes may be assigned to the channel selection control field 510. Various lengths of bytes may be assigned to a first IE field 521 and an N-th IE field 522 based on description of a corresponding IE.

The channel selection control field 510 may include a command ID field 511, a reserved field 513, a reason code field 515, and a channel bitmap field 517.

The command ID field 511 may be used to identify a use of the channel selection command frame 500. The use of the channel selection command frame 500 may be classified as a channel scanning request, a channel scanning response, a channel change request, and a channel change response. The communication device may transmit the channel selection command frame 500 of the channel scanning request to the discovery device. The discovery device may transmit the channel selection command frame 500 of the channel scanning response. Two bits may be assigned to the command type field 511.

Bits may be assigned to the reserved field 513 to indicate other messages. The reason code field 515 may be used to indicate a response of the discovery device when the use of the channel selection command frame 500 corresponds to the channel change response. For example, a case where the discovery device transmits the channel selection command frame 500 of the channel change response, a case where the channel is unavailable, a case where channel scan information conflicts with a channel change request, and a case where a channel to be changed by the discovery device is unsupported, for example, invalid, it may be indicated using bits assigned to the reason code field 515. Two bits may be assigned to the reason code field 515 to indicate the above four cases.

The channel bitmap field 517 may be used to indicate a channel to be scanned among channels communicable between the communication device and the discovery device. For example, when ten channels are communicable, ten bits may be assigned to the channels from channel 1 to channel 10. A channel indicated by '1' may be a channel to be scanned.

The plurality of IE fields 520 may include a DRP Availability IF field obtained for each scanning channel and a Channel Measurement IE field measured for each scanning channel. It will be further described with reference to FIG. 6 through FIG. 9.

Figure 6:
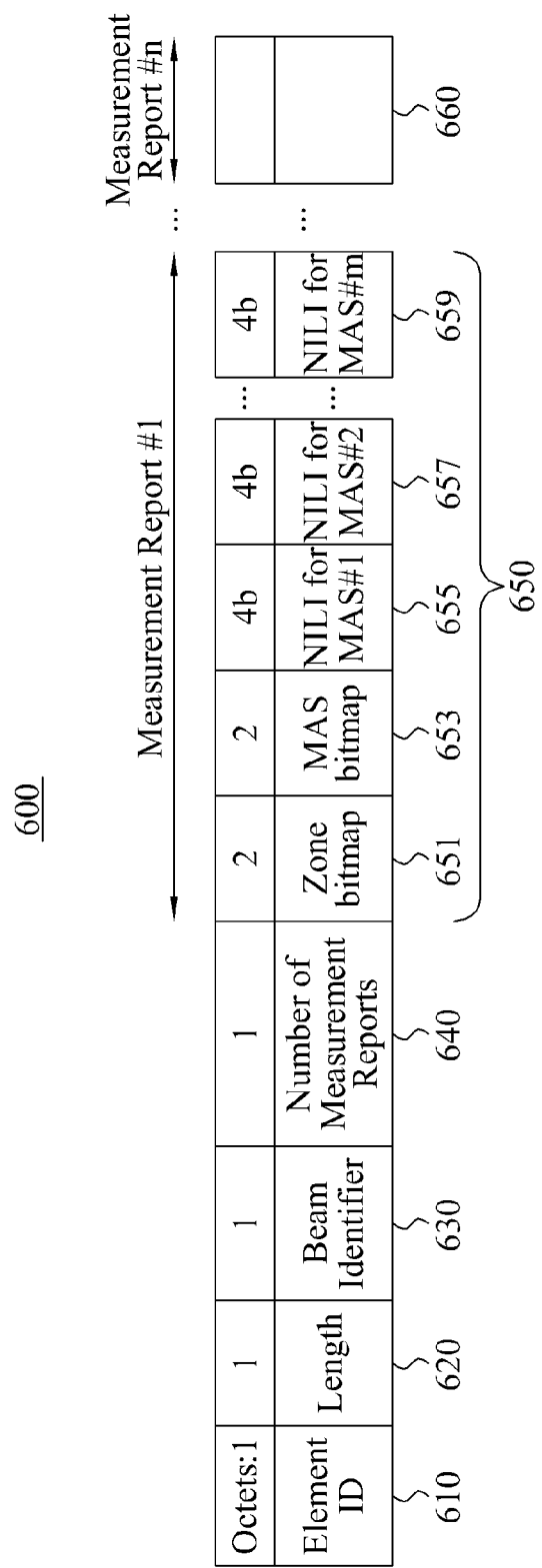
FIG. 6 illustrates a configuration of a Channel Measurement Information Element (IE) field according to an embodiment of the present invention.

FIG. 6 illustrates a configuration of a Channel Measurement IE field 600 according to an embodiment of the present invention.

Referring to FIG. 6, the Channel Measurement IE field 600 may include an element ID 610, length information 620, a beam identifier 630, measurement reports 650 and 660, and information about a number of measurement reports 640.

The element ID 610 may indicate that information included in an IE field is measurement information of a scanning channel. The length information 620 may indicate a length of a Channel Measurement IE. The beam identifier 630 may be used to identify a directional beam used for scanning. The measurement reports 650 and 660 may include measurement results of resources of the scanning channel. Information about the number of measurement reports 640 indicates the number of measurement reports 650 and 660.

16 zones may be generated by binding 16 continuous MASs as a single zone in a superframe including 256 MASs. Each zone may be indicated as a zone bitmap including 16 bits. In the superframe, a predetermined MAS may be indicated using a zone bitmap and a MAS bitmap. For example, in the zone bitmap, a zero-th bit indicates whether a zone including first 16 continuous MASs constituting the superframe is included in a measurement interval. Also, in the MAS bitmap, the zero-th bit indicates whether a first MAS of the corresponding zone is included in the measurement interval. Also, an NILI may be assigned in an order of positions of MASs with respect to MASs that are coded to 1 in the zone bitmap and the MAS bitmap, and correspond to a signal measurement target.

The measurement report 650 may include a zone bitmap 651, a MAS bitmap 653, and NILI values 655, 657, and 659 corresponding to respective MASs. 16 bits may be assigned to each of the zone bitmap 651 and the MAs bitmap 653. Whether a corresponding MAS is a signal measurement target may be known through each bit. Bits may be assigned to the NILI values 655, 657, and 659 based on a number of cases where a NILI is coded. Even the measurement report 660 may include the above information.

The measurement report 650 may include measurement results measured for each zone including a predetermined number of MASs or for each MAS included in the zone.

The measurement results may include a NILI measured for each MAS included in the zone. The NILI may be determined as a value coded to a noise plus interference level, based on a predetermined coding table. The predetermined coding table may be expressed by the following Table 1:

TABLE 1

| Value | NILI level (dBm) |
|---|---|
| 0 | $NILI_{power} \leq -110$ |
| 1 | $-110 < NILI_{power} \leq -102$ |
| 2 | $-102 < NILI_{power} \leq -94$ |
| 3 | $-94 < NILI_{power} \leq -86$ |
| 4 | $-86 < NILI_{power} \leq -78$ |
| 5 | $-78 < NILI_{power} \leq -70$ |
| 6 | $-70 < NILI_{power} \leq -62$ |
| 7 | $-62 < NILI_{power} \leq -54$ |

TABLE 1-continued

| Value | NILI level (dBm) |
|---|---|
| 8 | $-54 < \text{NILI}_{power} <= -46$ |
| 9 | $-46 < \text{NILI}_{power} <= -38$ |
| 10 | $-38 < \text{NILI}_{power} <= -30$ |
| 11 | $-30 < \text{NILI}_{power} <= -22$ |
| 12 | $-22 < \text{NILI}_{power} <= -14$ |
| 13 | $-14 < \text{NILI}_{power} <= -6$ |
| 14 | $-6 < \text{NILI}_{power} <= 2$ |
| 15 | $2 < \text{NILI}_{power}$ |

Here, NILIpower denotes' a noise plus interference level, that is, power of a noise plus interference signal, and a corresponding value may be coded based on a value of NILIpower. For example, when a value of NILIpower is '−100', a value coded to NILI may be '2'. As shown in Table 1, the NILI may be classified as 16 cases. Four bits may be assigned to each of the NILI values 655, 657, and 659.

When the superframe structure does not exist in the scanning channel, that is, when the discovery device does not receive a beacon message from a neighbor device, a value of the Channel Measurement IE field 600 may be differently set.

When the superframe structure does not exist in the scanning channel, a MAS may not be assigned to the scanning channel and thus, the zone bitmap 65 land the MAS bitmap 653 may have no value. Here, 0x0000 bits may be set to the zone bitmap 651 and the MAS bitmap 653. Also, '1' may be set to information about the number of measurement reports 640. Since no MAS is assigned, that the superframe structure does not exist in the scanning channel may be indicated using a single measurement report. Also, the average NILI value of the scanning channel may be coded to a NILI field according to Table 1. Also, since four bits are assigned to the NILI field, four bits of padding bits may be added for byte sorting.

Figures 7, 8:
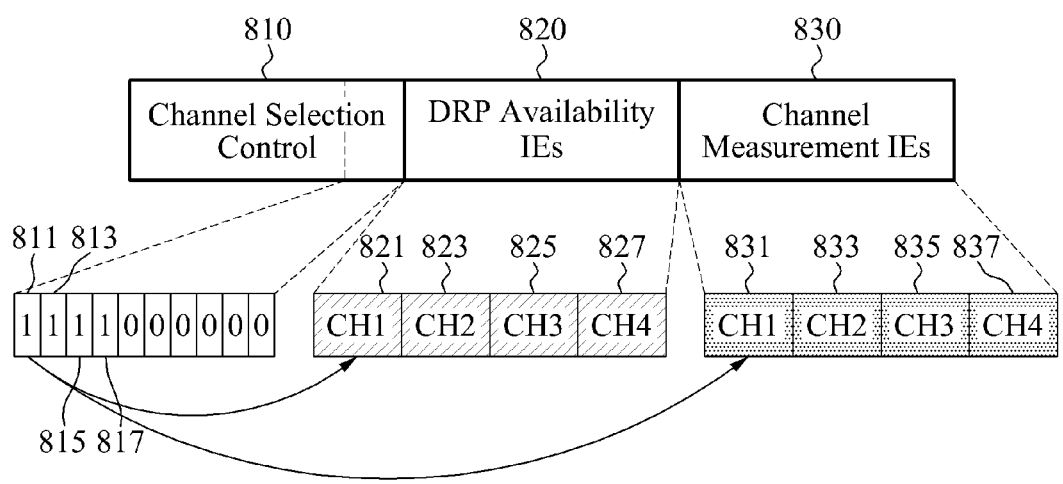
FIG. 7 illustrates a configuration of a Distributed Reservation Protocol (DRP) Availability IE field according to an embodiment of the present invention.
FIG. 8 illustrates a configuration of a channel selection command frame when four scanning channels are present according to an embodiment of the present invention.

FIG. 7 illustrates a configuration of a DRP Availability IE field 700 according to an embodiment of the present invention.

The DRP Availability IE field 700 may include an element ID 710, length information 720, and a DRP Availability bitmap 730.

The element ID 710 may indicate that information included in an IE field is DRP Availability IE assigned to the scanning channel. The DRP Availability bitmap 730 may indicate whether MASs constituting the scanning channel are available, based on a bit unit. The length information 720 may indicate a length of the DRP Availability bitmap 730.

Since a superframe includes 256 MASs, the DRP Availability bitmap 730 may be indicated as a bitmap having a maximum length of 256 bits.

When a superframe structure does not exist in the scanning channel, that is, when a discovery device does not receive a beacon message from a neighbor device, a value of the DRP Availability IE field 700 may be differently set.

When the superframe structure does not exist in the scanning channel, a MAS may not be assigned to the scanning channel and thus, the DRP Availability bitmap 730 may have no value. Also, '0' may be set to the length information 720. The DRP Availability IE field 700 may include only the element ID 710 and the length information 720 in which '0' is set.

FIG. 8 illustrates a configuration of a channel selection command frame 800 when four scanning channels are present according to an embodiment of the present invention.

Referring to FIG. 8, the channel selection command frame 800 may include a channel selection control field 810, DRP Availability IE field 820, and Channel Measurement IE field 830.

The channel selection control field 810 may indicate information about a channel to be scanned using bits assigned to a channel bitmap field. Channels corresponding to portions 811, 813, 815, and 817 in which '1' is assigned to a corresponding channel bitmap field may be channels to be scanned. In FIG. 8, among ten channels, a first channel, a second channel, a third channel, and a fourth channel may be channels to be scanned. A relationship between a value assigned to the channel bitmap field and a corresponding channel may vary based on a user setting.

The DRP Availability IE field 820 may include DRP Availability IEs 821, 823, 825, and 827 of respective corresponding channels to be scanned. The DRP Availability IEs 821, 823, 825, and 827 may be arranged based on a channel order indicated in the channel bitmap. Therefore, the DRP Availability IE 821 indicates a DRP Availability IE of the first channel, the DRP Availability IE 823 indicates a DRP Availability IE of the second channel, the DRP Availability IE 825 indicates a DRP Availability IE of the third channel, and the DRP Availability IE 827 indicates a DRP Availability IE of the fourth channel. The DRP Availability IEs 821, 823, 825, and 827 may be configured as shown in FIG. 7.

The Channel Measurement IE field 830 followed by the DRP Availability IE field 820 may include Channel Measurement IEs 831, 833, 835, and 837 of respective corresponding channels. Also, the Channel Measurement IEs 831, 833, 835, and 837 may be arranged based on a channel order indicated in the channel bitmap. Therefore, the Channel Measurement IE 831 indicates a Channel Measurement IE of the first channel, the Channel Measurement IE 833 indicates a Channel Measurement IE of the second channel, the Channel Measurement IE 835 indicates a Channel Measurement IE of the third channel, and the Channel Measurement IE 837 indicates a Channel Measurement IE of the fourth channel. Here, the Channel Measurement IEs 831, 833, 835, 837 may be configured as shown in FIG. 6.

Figure 9:
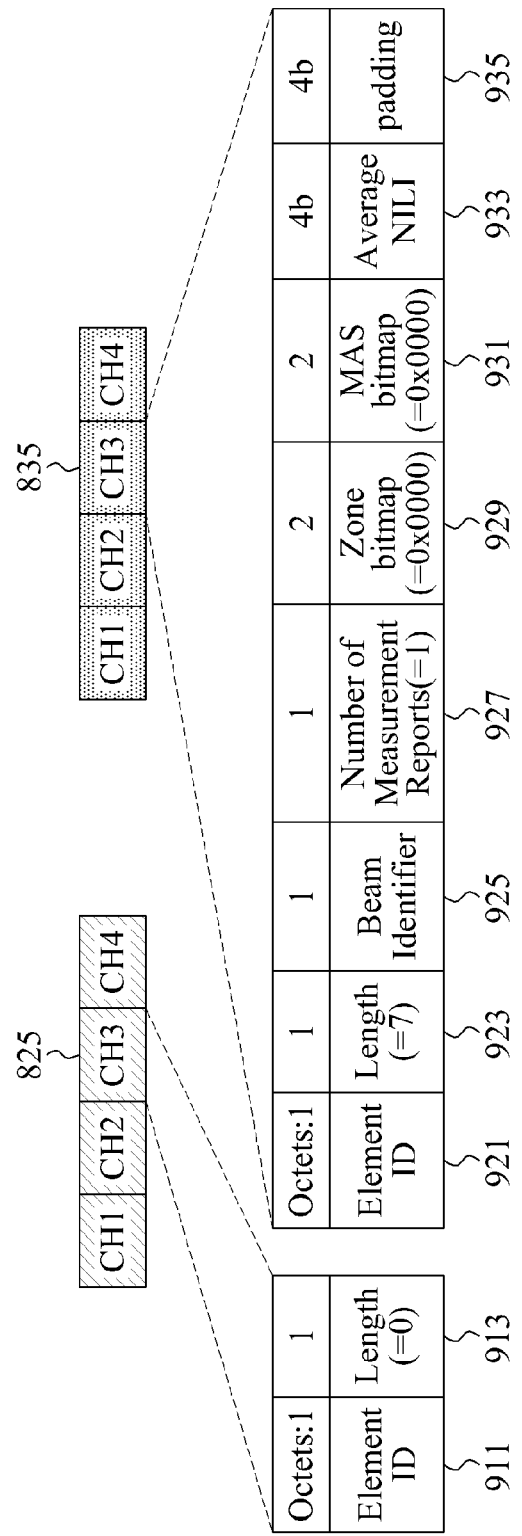
FIG. 9 illustrates a configuration of a Channel Measurement IE field and a DRP Availability IE field when a superframe structure is not supported in a portion of scanning channels according to an embodiment of the present invention.

FIG. 9 illustrates a configuration of a Channel Measurement IE 835 and a DRP Availability IE 825 when a superframe structure is not supported in a portion of scanning channels according to an embodiment of the present invention.

Referring to FIG. 9, when the superframe structure does not present in a third channel, the configuration of the DRP Availability IE 825 and the Channel Measurement IE 835 with respect to the third channel may be known.

When the superframe structure does not exist in the third channel, the DRP Availability IE 825 may include an element ID field 911 and a length information field 913. The length information field 913 may indicate a length of a DRB availability bitmap. When the superframe structure does not exist, there is no available resource. Therefore, the DRP Availability bitmap cannot be defined. Here, '0' may be set to the length information field 913.

When the superframe structure does not exist in the third channel, the Channel Measurement IE 835 may include an element ID field 921, a length information field 923, a beam identifier field 925, a field for a number of measurement reports 927, a zone bitmap field 929, a MAS bitmap field 931, an NILI field 933 of the third channel, and a padding field 935.

The length information field 923 may indicate a total length of the beam identifier field 925, the field for the number of measurement reports 927, the zone bitmap field 929, the MAS bitmap field 931, the NILI field 933 of the third channel, and the padding field 935.

'1' may be set to the field for the number of measurement fields 927. When the superframe structure exists in a channel, a measurement report may include measurement information about a predetermined MAS. When the superframe structure does not exist in the channel, that the superframe structure does not exist in the channel may be indicated using a single measurement report. Therefore, '1' indicating a single measurement report may be set to the field for the number of measurement reports 927.

Since no MAS is assigned to the channel, the zone bitmap field 929 and the MAS bitmap field 931 cannot be defined and instead, 0x0000 may be set.

The average noise plus interference level measured in the third channel during the whole scanning period may be set to the NILI field) 933. Here, the average noise plus interference level may be coded to a value mapping in a coding table.

Four bits of padding bits may be assigned to the padding field 935 for byte sorting together with the NILI field 933. This is because four bits are assigned to the NILI field 933.

Figure 10:
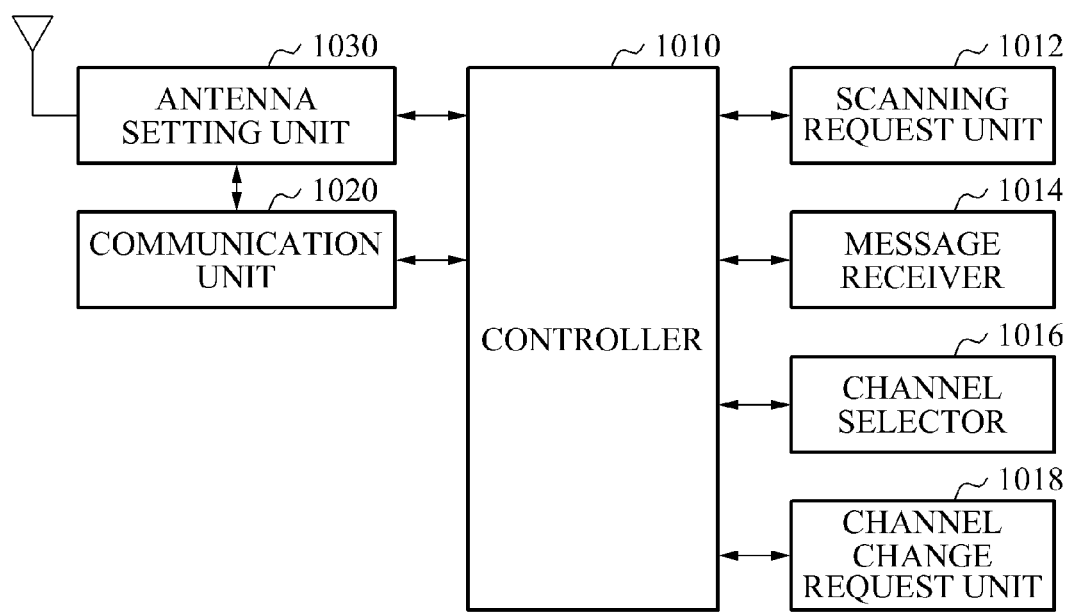
FIG. 10 is a block diagram illustrating a configuration of a communication device to select a communication channel in a wireless communication system according to an embodiment of the present invention.

FIG. 10 is a block diagram illustrating a configuration of a communication device to select a communication channel in a wireless communication system according to an embodiment of the present invention.

Referring to FIG. 10, the communication device may include a controller 1010, a scanning request unit 1012, a message receiver 1014, a channel selector 1016, a channel change request unit 1018, a communication unit 1020, and an antenna setting unit 1030.

The communication unit 1020 may wirelessly transmit and receive data to and from a neighbor device and a discovery device. In the case of receiving a signal, the communication unit 1020 may perform dispreading and channel decoding of the received signal by decreasing a frequency of a radio frequency (RF) signal received via a directional antenna. In the case of transmitting a signal, the communication unit 1020 may perform channel coding and spreading of data and increase a frequency of an RF signal, thereby transmit the signal via a directional antenna.

The antenna setting unit 1030 may align directional antennas so that the optimal communication quality may be guaranteed through an antenna training process with the discovery device.

The scanning request unit 1012 may request scanning of channels allowed for a communication between the communication device and the discovery device.

The message receiver 1014 may receive a channel scanning response message including a Channel Measurement IE and a DRP Availability IE for each scanned communication channel.

The channel selector 1016 may select a communication channel based on the Channel Measurement IE and the DRP Availability IE.

The channel change request unit 1018 may request the discovery device for a channel change to the selected communication channel by transmitting information about the selected communication channel to the discovery device.

The controller 1010 may control the overall operation of the communication device, and may perform functionalities of the scanning request unit 1012, the message receiver 1014, the channel selector 1016, the channel change request unit 1018, and the antenna setting unit 1030. In the present embodiment, constituent elements are separately illustrated to discern respective functions from each other. Therefore, when an actual product is produced, all of or a portion of the constituent elements may be configured to be processed in the controller 1010.

Figure 11:
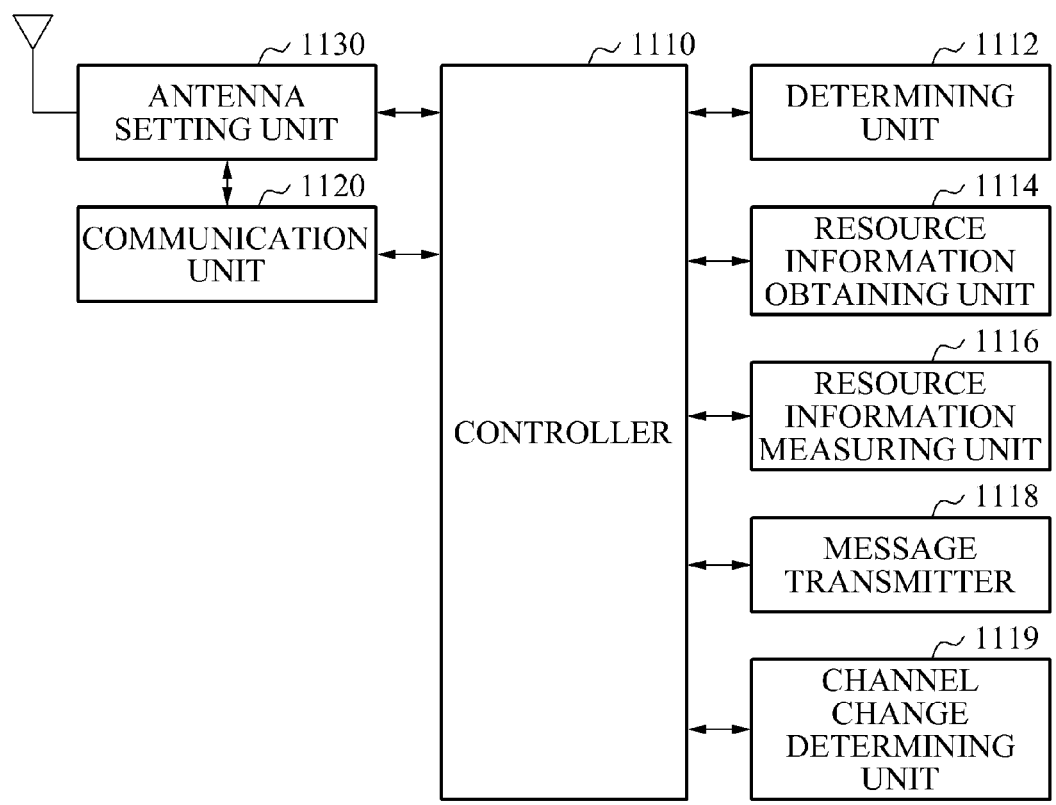
FIG. 11 is a block diagram illustrating a configuration of a discovery device to select a communication channel in a wireless communication system according to an embodiment of the present invention.

FIG. 11 is a block diagram illustrating a configuration of a discovery device to select a communication channel in a wireless communication system according to an embodiment of the present invention.

Referring to FIG. 11, the discovery device may include a controller 1110, a determining unit 1112, a resource information obtaining unit 1114, a resource information measuring unit 1116, a message transmitter 1118, a channel change determining unit 1119, a communication unit 1120, and an antenna setting unit 1130.

The communication unit 1120 may wirelessly transmit and receive data to and from a neighbor device and a communication device. In the case of receiving a signal, the communication unit 1120 may perform dispreading and channel decoding of the received signal by decreasing a frequency of an RF signal received via a directional antenna. In the case of transmitting a signal, the communication unit 1120 may perform channel coding and spreading of data and increase a frequency of an RF signal, thereby transmit the signal via a directional antenna.

The antenna setting unit 1130 may align directional antennas so that the optimal communication quality may be guaranteed through an antenna training process with the communication device.

The determining unit 1112 may determine whether a superframe structure exists in a scanning channel. The determining unit 1112 may determine whether the superframe structure exists in the scanning channel, based on whether a beacon message is received from neighbor devices as a channel scanning result.

The resource information obtaining unit 1114 may obtain a DRP Availability IE assigned for the scanning channel through the beacon message that is received by the scanning channel from the neighbor devices.

The resource information measuring unit 1116 may measure a noise plus interference level corresponding to resources of the scanning channel.

The message transmitter 1118 may transmit a channel scanning response message including a Channel Measurement IE and a DRP Availability IE. Here, the Channel Measurement IE may include information about whether the superframe structure exists and information about the measured noise plus interference level for each scanned communication channel.

The channel change determining unit 1119 may determine whether to change a channel in response to a channel change request for a channel change to the selected communication channel, based on the channel scanning response message. The channel change determining unit 1119 may reject the channel change on the ground of that a resource to perform communication is insufficient in the communication channel selected by the communication device. Also, the channel change determining unit 1119 may reject the channel change on the ground of a decision that does not match description included in the channel scanning response message. Also, the channel change determining unit 1119 may reject the channel change on the ground of that the selected channel is a change unsupported by the discovery device.

The controller 1110 may control the overall operation of the discovery device, and may perform functionalities of the determining unit 1112, the resource information obtaining unit 1114, the resource information measuring unit 1116, the message transmitter 1118, the channel change determining unit 1119, and the antenna setting unit 1130. In the present embodiment, constituent elements are separately illustrated to discern respective functions from each other. Therefore, when an actual product is produced, all of or a portion of the constituent elements may be configured to be processed in the controller 1110.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of selecting a communication channel in a communication device of a wireless communication system, the method comprising:
   requesting scanning of channels between the communication device and a discovery device;
   receiving a channel scanning response message comprising a Distributed Reservation Protocol (DRP) Availability Information Element (IE) assigned for each scanned channel; and
   selecting a channel based on the DRP Availability IE;
   wherein the selecting comprises obtaining information about an available resource based on the DRP Availability IE, and selecting a communication channel having a largest number of Medium Access Slots in which an effect of noise and interference is less than or equal to a predetermined reference;
   wherein the channel scanning response message comprises a Channel Measurement IE; and
   wherein the Channel Measurement IE comprises information about whether a superframe structure exists in the scanned channel and information about a noise plus interference level corresponding to resources of the scanned channel.

2. The method of claim 1, wherein the requesting comprises transmitting information about a channel to be scanned using a channel bitmap field.

3. The method of claim 1, wherein the DRP Availability IE comprises a time interval, a frequency, a code, or a combination thereof.

4. The method of claim 1, wherein the DRP Availability IE comprises an availability of a Medium Access Slot (MAS) constituting the scanned channel.

5. The method of claim 1, further comprising:
   requesting the discovery device for a resource based on the DRP Availability IE and the Channel Measurement IE of the selected channel to be assigned with the resource from the discovery device.

6. The method of claim 1, wherein:
   the requesting comprises requesting scanning of the channels using a channel selection command frame,
   the channel selection command frame comprises a channel selection control field, and
   the channel selection control field comprises a command identification (ID) field indicating that a use of the channel selection command frame is a channel scanning request, a reason code field, and a channel bitmap field indicating a channel to be scanned.

7. The method of claim 1, wherein:
   the receiving comprises receiving the channel scanning response message using a channel selection command frame,
   the channel selection command frame comprises a channel selection control field and IE fields, and
   the channel selection control field comprises a channel bitmap field indicating a channel scanned by the discovery device, and the IE fields comprise a Channel Measurement IE field and a DRP Availability IE field corresponding to the scanned channel.

8. The method of claim 7, wherein the DRP Availability IE field comprises DRP Availability indicating whether MASs constituting the scanned channel are available, and length information indicating a length, in terms of available MASs, of the DRP Availability.

9. The method of claim 8, wherein when a superframe structure does not exist in the scanned channel, '0' is set to length information indicating the length, in terms of available MASs, of the DRP Availability.

10. The method of claim 7, wherein the Channel Measurement IE field comprises ID information indicating a Channel Measurement IE, length information indicating a length of the Channel Measurement IE, a beam identifier for identifying a directional beam used for the scanning, a measurement report comprising measurement results of resources of the scanned channel, and information about a number of measurement reports.

11. The method of claim 10, wherein the measurement report comprises a zone bitmap for identifying zones comprising a predetermined number of MASs and a MAS bitmap for identifying MASs included in each zone.

12. The method of claim 11, wherein the measurement reports comprise a noise plus interference level indicator (NILI) measured for each MAS included in each zone.

13. The method of claim 12, wherein the NILI is determined as a value coded to a measured noise plus interference level based on a predetermined coding table.

14. The method of claim 12, wherein when a superframe structure does not exist in the scanned channel, '1' is set to information about the number of measurement reports, '0' is set to the zone bitmap and the MAS bitmap, and an NILI coded to the average noise plus interference level of the scanned channel is set in the measurement results.

15. A method of selecting a communication channel in a discovery device of a wireless communication system, the method comprising:
   obtaining a Distributed Reservation Protocol (DRP) Availability Information Element (IE) assigned to a scanned channel through a beacon message that is received by the scanned channel from neighbor devices;
   measuring a noise plus interference level corresponding to resources of the scanned channel; and
   transmitting a channel scanning response message comprising a Channel Measurement IE and the DRP Availability IE, the Channel Measurement IE comprising information about whether a superframe structure exists for each scanned channel and information about the measured noise plus interference level, and a noise plus interference level indicator (NILI) measured for each of Medium Access Slots (MASs) constituting the scanned channel, wherein the NILI is coded to an average noise plus interference level of the scanned channel.

16. The method of claim 15, further comprising:
   determining whether the superframe structure exists in the scanned channel based on whether the beacon message is received by the scanned channel from the neighbor devices.

17. The method of claim 15, further comprising:
   receiving, from a communication device, a channel scanning request message requesting scanning of channels allowed for communication between the communication device and a discovery device.

18. The method of claim 15, further comprising:
receiving, from a communication device, a request for a resource with respect to a selected channel, and assigning the resource to the communication device.

19. The method of claim 15, wherein:
the transmitting comprises transmitting the channel scanning response message using a channel selection command frame,
the channel selection command frame comprises a channel selection control field and IE fields, and
the channel selection control field comprises a channel bitmap field indicating a scanned channel, and the IE fields comprise a Channel Measurement IE field and a DRP Availability IE field assigned for each scanned channel.

20. The method of claim 19, wherein the DRP Availability IE field comprises DRP Availability indicating whether MASs constituting the scanned channel are available, and length information indicating a length, in terms of available MASs, of the DRP Availability.

21. The method of claim 20, wherein when the superframe structure does not exist in the scanned channel, '0' is set to length information indicating the length, in terms of available MASs, of the DRP Availability.

22. The method of claim 19, wherein the Channel Measurement IE field comprises ID information indicating the Channel Measurement IE, length information indicating a length of the Channel Measurement IE, a beam identifier for identifying a directional beam used for the scanning, a measurement report comprising measurement results of resources of the scanned channel, and information about a number of measurement reports.

23. The method of claim 22, wherein when the superframe structure does not exist in the scanned channel, '1' is set to information about the number of measurement reports, '0' is set to a zone bitmap for identifying zones comprising a predetermined number of MASs and a MAS bitmap for identifying MASs included in each zone, and a noise plus interference level indicator (NILI) coded to the average noise plus interference level of the scanned channel is set in the measurement results.

24. An apparatus for selecting a communication channel in a communication device of a wireless communication system, the apparatus comprising:
a scanning request unit to request scanning of channels between the communication device and a discovery device;
a message receiver to receive a channel scanning response message comprising a Distributed Reservation Protocol (DRP) Availability Information Element (IE) assigned for each scanned communication channel and a Channel Measurement IE;
a channel selector to select a channel based on the Channel Measurement IE and the DRP Availability IE; and
a channel change request unit to request a channel change to the selected channel by transmitting information about the selected channel to the discovery device;
wherein the channel selector is further to select the channel based on information about an available resource based on the DRP Availability IE, and to select a communication channel having a largest number of Medium Access Slots in which an effect of noise and interference is less than or equal to a predetermined reference;
wherein the Channel Measurement IE comprises information about whether a superframe structure exists in the scanned channel and information about a noise plus interference level corresponding to resources of the scanned channel.

25. An apparatus for selecting a communication channel in a discovery device of a wireless communication system, the apparatus comprising:
a determining unit to determine whether a superframe structure exists in a scanned channel;
a resource information obtaining unit to obtain a Distributed Reservation Protocol (DRP) Availability Information Element (IE) assigned to the scanned channel through a beacon message that is received by the scanned channel from neighbor devices;
a resource information measuring unit to measure a noise plus interference level corresponding to resources of the scanned channel;
a message transmitter to transmit a channel scanning response message comprising the DRP Availability IE and a Channel Measurement IE comprising information about whether the superframe structure exists for each scanned channel and information about the measured noise plus interference level, and a noise plus interference level indicator (NILI) measured for each of Medium Access Slots (MASs) constituting the scanned channel, wherein the NILI is coded to an average noise plus interference level of the scanned channel; and
a channel change determining unit to determine whether to change a channel in response to a channel change request for changing a channel to a channel that is determined based on the channel scanning response message.

* * * * *